(12) United States Patent
Yeh et al.

(10) Patent No.: US 9,859,778 B2
(45) Date of Patent: Jan. 2, 2018

(54) ENERGY HARVESTING DEVICE

(71) Applicant: TAIWAN SEMICONDUCTOR MANUFACTURING COMPANY LTD., Hsinchu (TW)

(72) Inventors: En-Hsiang Yeh, Hsin-Chu (TW); Monsen Liu, Hsinchu County (TW); Chuei-Tang Wang, Taichung (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 1 day.

(21) Appl. No.: 15/193,844

(22) Filed: Jun. 27, 2016

(65) Prior Publication Data
US 2016/0308429 A1    Oct. 20, 2016

Related U.S. Application Data

(63) Continuation of application No. 14/078,098, filed on Nov. 12, 2013, now Pat. No. 9,407,184.

(51) Int. Cl.
| | |
|---|---|
| *H02K 33/00* | (2006.01) |
| *H02K 41/02* | (2006.01) |
| *H02N 2/18* | (2006.01) |
| *H02P 9/00* | (2006.01) |
| *H02K 33/16* | (2006.01) |

(52) U.S. Cl.
CPC ............. *H02K 33/00* (2013.01); *H02K 33/16* (2013.01); *H02P 9/00* (2013.01); *H02K 2201/18* (2013.01)

(58) Field of Classification Search
CPC .................................. H02K 33/00; H02N 2/18
USPC ....... 310/12.03, 20, 25, 36, 51, 81, 303, 339
See application file for complete search history.

(56) References Cited

U.S. PATENT DOCUMENTS

| | | | | |
|---|---|---|---|---|
| 2008/0238592 | A1* | 10/2008 | Ko | ........................ G02B 26/085 335/222 |
| 2010/0187835 | A1* | 7/2010 | Hohlfeld | ............... B81B 3/0021 290/1 R |
| 2011/0063059 | A1* | 3/2011 | Takahashi | .............. H02K 35/02 335/306 |
| 2012/0235647 | A1* | 9/2012 | Chung | .................... G01P 15/11 322/3 |

* cited by examiner

*Primary Examiner* — Jose Gonzalez Quinones
(74) *Attorney, Agent, or Firm* — WPAT, P.C., Intellectual Property Attorneys; Anthony King

(57) ABSTRACT

An energy harvesting device comprises a semiconductor device, and a first magnet core. The semiconductor device, disposed in a housing, includes planar inductors. The first magnet core, having a first surface over the planar inductors, is configured to move with respect to the semiconductor device in a first direction that reduces a first vertical distance between the plane and the first surface.

20 Claims, 6 Drawing Sheets

ENERGY HARVESTING DEVICE

PRIORITY CLAIM AND CROSS-REFERENCE

This application is a continuation application of U.S. application Ser. No. 14/078,098 filed on Nov. 12, 2013, the disclosure of which is hereby incorporated by reference in its entirety.

TECHNICAL FIELD

The present disclosure is generally related to an energy harvesting device and, in particular, to an energy harvesting device for collecting energy in all directions.

BACKGROUND

Energy harvesting is a process to collect energy from external sources such as solar power, thermal energy, wind energy, salinity gradients, and kinetic energy. While energy harvesting devices collect a small amount of power, the energy source is free and the harvesting process is environmentally friendly. As a result, energy harvesting devices have become increasingly attractive.

BRIEF DESCRIPTION OF THE DRAWINGS

The details of one or more embodiments of the disclosure are set forth in the accompanying drawings and the description below. Other features and advantages of the disclosure will be apparent from the description, drawings and claims.

Like reference symbols in the various drawings indicate like elements.

DETAIL DESCRIPTION

Figure 1A:
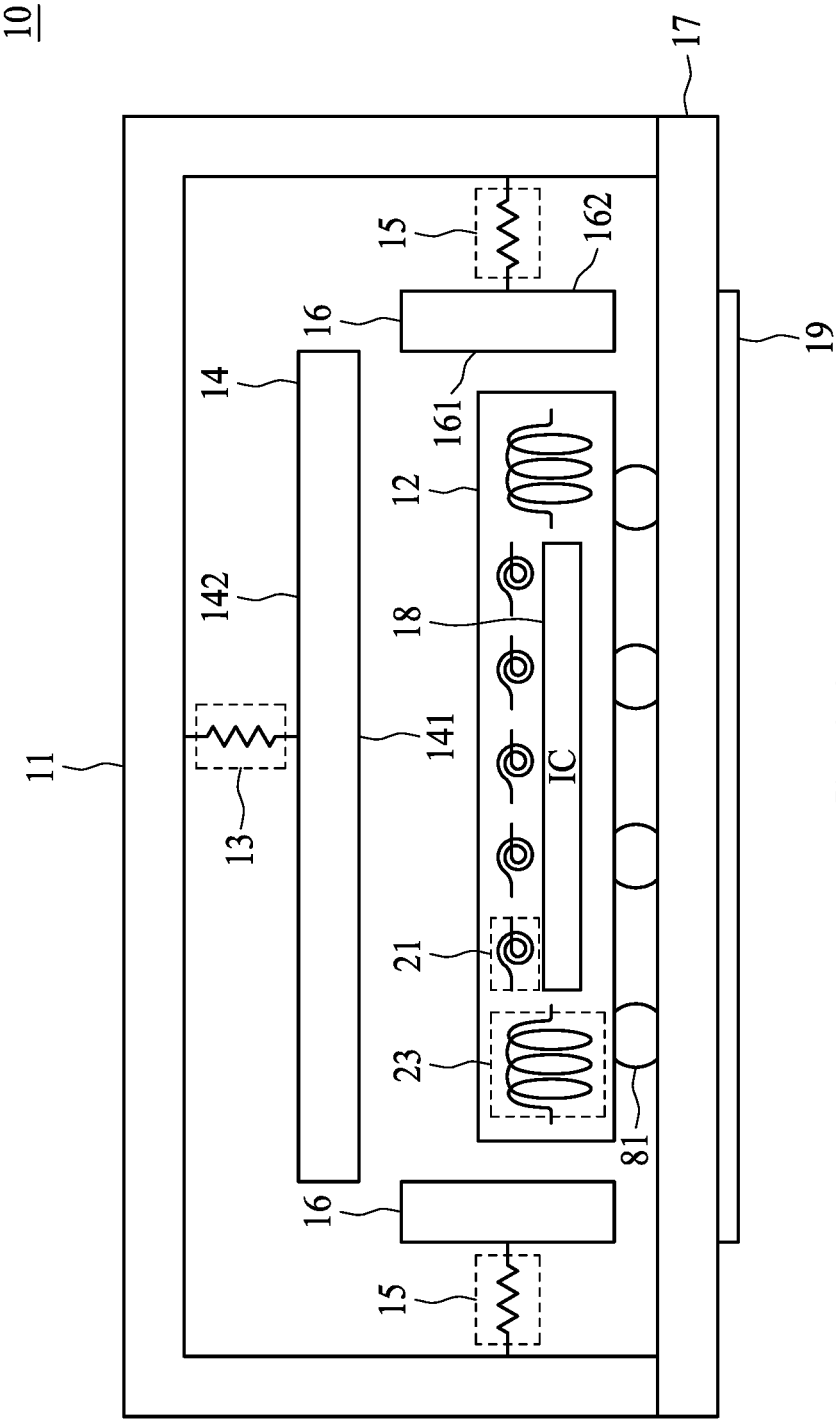
FIG. 1A is a schematic cross-sectional view of an energy harvesting device in accordance with some embodiments.

Embodiments, or examples, of the disclosure illustrated in the drawings are now described using specific languages. It will nevertheless be understood that no limitation of the scope of the disclosure is thereby intended. Any alterations and modifications in the described embodiments, and any further applications of principles described in this document are contemplated as would normally occur to one of ordinary skill in the art to which the disclosure relates.

Reference numbers may be repeated throughout the embodiments, but this does not necessarily require that feature(s) of one embodiment apply to another embodiment, even if they share the same reference number. It will be understood that when an element is referred to as being "connected to" or "coupled with" another element, it may be directly connected to or coupled to the other element, or intervening elements may be present.

FIG. 1A is a schematic cross-sectional view of an energy harvesting device 10 in accordance with some embodiments. In some embodiments, energy harvesting device 10 is attachable to a wearable article. Examples of the wearable article include but are not limited to a hat, a cap, a pair of glasses, a necklace, a wrist watch, a bracelet, a belt and shoes. When the wearable article moves as a user moves, kinetic energy due to the motion is transformed into electric energy by energy harvesting device 10.

Referring to FIG. 1A, energy harvesting device 10 comprises a housing 11, a first elastic component 13, at least one second elastic component 15, a circuit board 17, a battery 19, a semiconductor device 12, a first magnetic core 14, and at least one second magnetic core 16.

Semiconductor device 12, disposed in housing 11, is coupled to a circuit board 17 via connectors 81. Circuit board 17 includes, for example, a printed circuit board (PCB). Moreover, semiconductor device 12 includes first sensors 21, second sensors 23, and an integrated circuit (IC) 18. First sensors 21 are arranged along a first direction, for example, X direction. In some embodiments, first sensors 21 are arranged along a second direction, for example, Y direction. En still some embodiments, first sensors 21 are arranged in an array at an X-Y plane. Moreover, first sensors 21 include planar inductors. First sensors 21 may be connected in series or in parallel in implementation.

Second sensors 23 are arranged along the X direction. In some embodiments, second sensors 23 are arranged along the Y direction. In still some embodiments, first sensors 21 are arranged in an array at an X-Y plane, and second sensors 23 are arranged to surround first sensors 21. Second sensors 23 in some embodiments include vertical inductors. Furthermore, second sensors 23 may be connected in series or in parallel.

IC 18 is configured to manage harvested energy. The harvested energy, for example, electric energy derived from kinetic energy, is stored in battery 19. IC 18, first sensors 21 and second sensors 23 are encapsulated in a plastic molding.

First magnet core 14, disposed over semiconductor device 12, includes magnets that create a magnetic field. First magnet core 14 has a first surface 141 and a second surface 142 opposite to first surface 141. First surface 141 of first magnet core 14 faces semiconductor device 12. Second surface 142 of first magnet core 14 is coupled to an inner wall of housing 11 via first elastic component 13.

First elastic component 13 is configured to extend in the first direction, the second direction and a third direction, for example, Z direction, and allow first magnet core 14 to move with respect to semiconductor device 12. In some embodiments, first elastic component 13 includes a spring rod. In other embodiments, first elastic component 13 includes an elastic cantilever. As first magnet core 14 moves, interaction, along the third direction, between the magnetic field established by first magnet core 14 and first sensors 21 in semiconductor device 12 generates induced current in first sensors 21. The induced current is then collected by IC 18 in the form of electric energy.

Second magnet core 16, disposed between another inner wall of housing 11 and semiconductor device 12, includes magnets that create a magnetic field. Second magnet core 16 has a first surface 161 and a second surface 162 opposite to first surface 161. First surface 161 of second magnet core 16 faces semiconductor 12. Second surface 162 of second magnet core 16 is coupled to the other inner wall of housing 11 via second elastic component 15.

Second elastic component 15 is configured to extend in the first direction and allow second magnet core 16 to move with respect to semiconductor device 12. In some embodiments, second elastic component 15 includes a spring rod. In other embodiments, second elastic component 15 includes an elastic cantilever. As second magnet core 16 moves, interactions, along the first direction, between the magnetic field established by second magnet core 16 and second sensors 23 in semiconductor device 12 generates induced current in second sensors 23. The induced current is then collected by IC 18 in the form of electric energy.

Figure 1B:
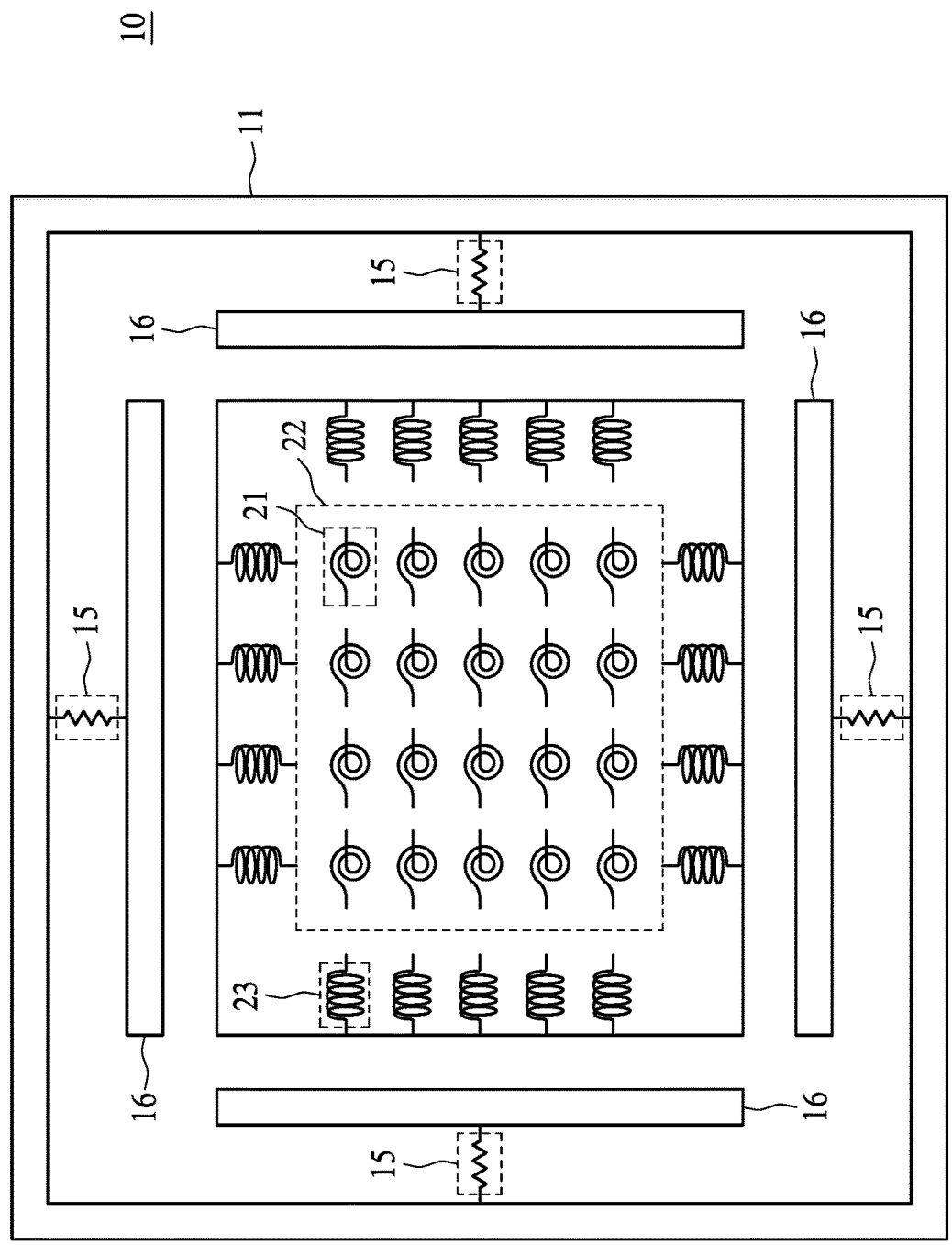
FIG. 1B is a schematic top view of the energy harvesting device illustrated in FIG. 1A in accordance with some embodiments.

FIG. 1B is a schematic top view of the energy harvesting device 10 illustrated in FIG. 1A in accordance with some embodiments. Referring to FIG. 1B, semiconductor device 12 includes a sensor array 22 which includes the first sensors 21 arranged in an array at the X-Y plane. In some embodiments, sensor array 22 is surrounded by second sensors 23. In that case, additional second elastic components 15 and additional second magnet cores 16 are provided to facilitate energy collection in the second direction. Additional second elastic component 15 is thus configured to extend in the second direction and allow additional second magnet core 16 to move with respect to semiconductor device 12 in the second direction. As additional second magnet core 16 moves, interactions, along the second direction, between the magnetic field established by additional second magnet core 16 and second sensors 23 in semiconductor device 12 generates induced current in second sensors 23. The induced current is then collected by IC 18 in the form of electric energy.

In other embodiments, semiconductor device 12 includes a stack of sensor arrays including sensor array 22. Moreover, the stack extends in the third direction.

Figure 2:
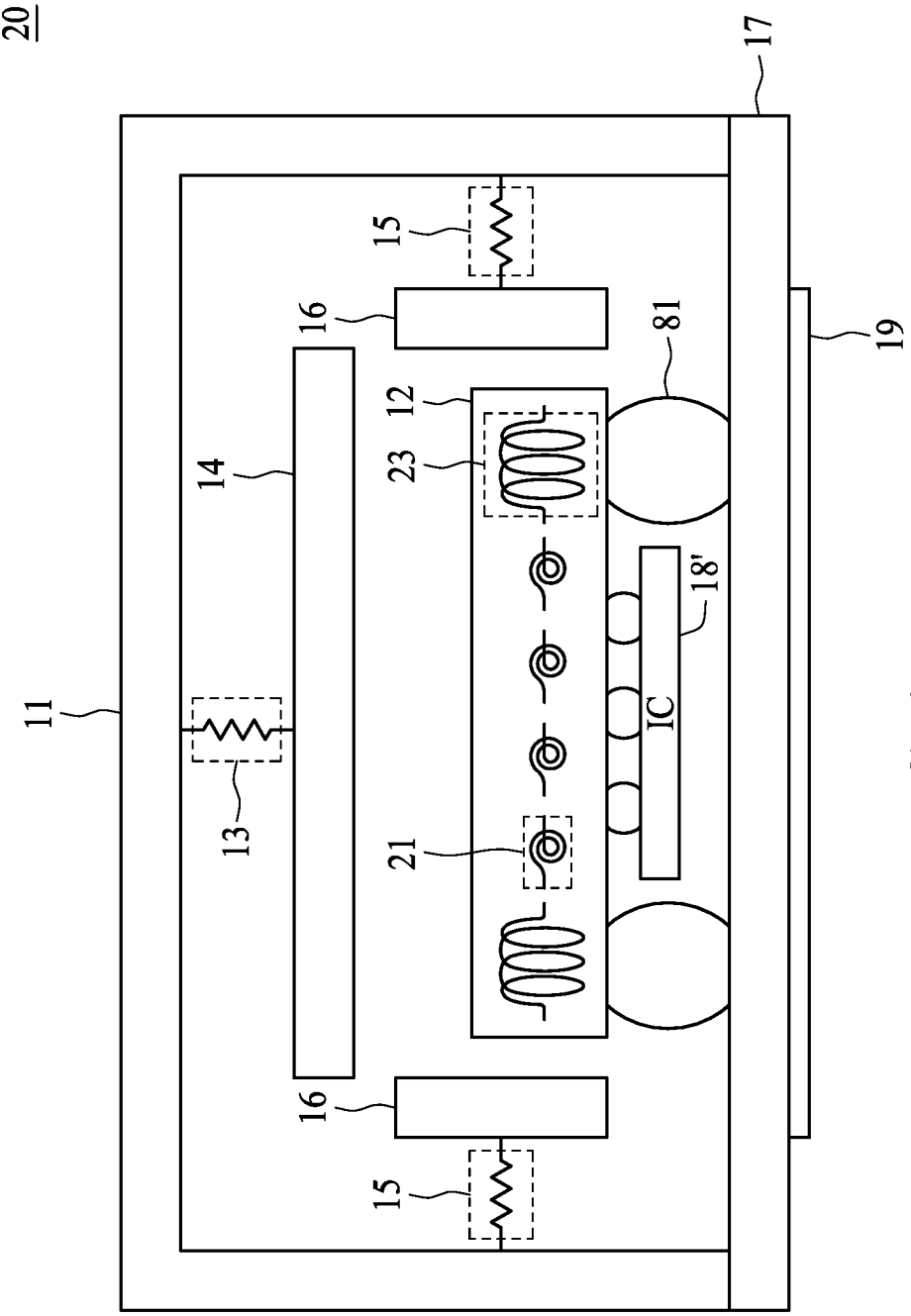
FIG. 2 is a schematic cross-sectional view of an energy harvesting device in accordance with some embodiments.

FIG. 2 is a schematic cross-sectional view of an energy harvesting device 20 in accordance with some embodiments. In some embodiments, referring to FIG. 2, energy harvesting device 20 is similar to energy harvesting device 10 described and illustrated with reference to FIG. 1A except that, for example, IC 18' is external to semiconductor device 12. Disposing IC 18' out of semiconductor device 12 makes space for additional sensors 21 or 23 or both in semiconductor device 12. Similar to IC 18 in FIG. 1A, IC 18' is configured to manage harvested energy and store the harvested energy in battery 19.

Figure 3A:
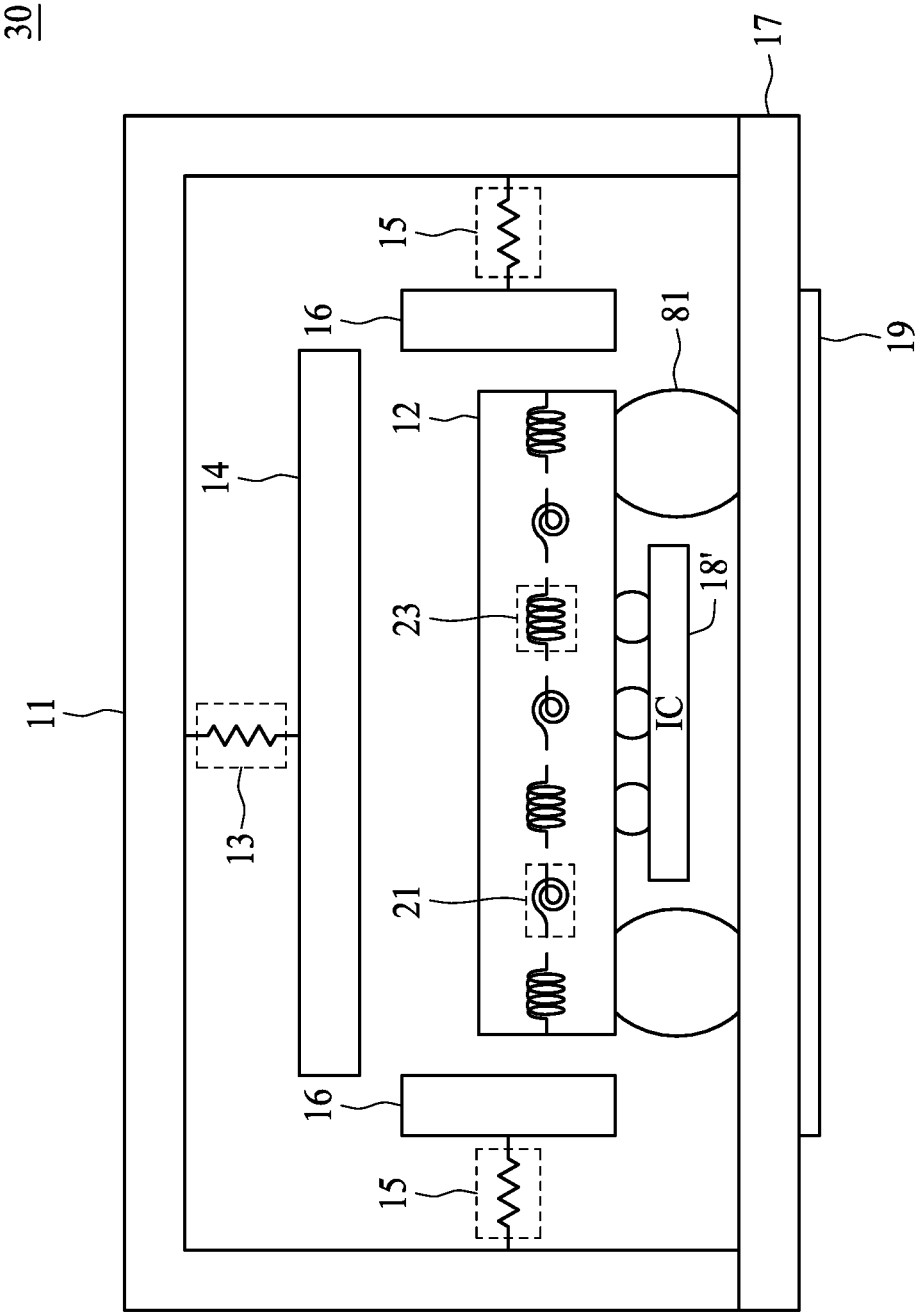
FIG. 3A is a schematic cross-sectional view of an energy harvesting device in accordance with some embodiments.

FIG. 3A is a schematic cross-sectional view of an energy harvesting device 30 in accordance with some embodiments. Referring to FIG. 3A, energy harvesting device 30 comprises housing 11, first elastic component 13, at least one second elastic component 15, circuit board 17, battery 19, semiconductor device 12, first magnetic core 14, at least one second magnetic core 16 and IC 18'.

Semiconductor device 12, disposed in housing 11, is coupled to a circuit board 17 via connectors 81. Moreover, semiconductor device 12 includes first sensors 21 and second sensors 23. First sensors 21 include for example, planar inductors, and second sensors 23 include, for example, vertical inductors.

First sensors 21 and second sensors 23 are alternately arranged along the X direction. In other embodiments, first sensors 21 and second sensors 23 are alternately spaced and arranged along the Y direction. In still other embodiments, first sensors 21 and second sensors 23 are arranged in an array at the X-Y plane with sensors 21 and 23 in a row or column being alternately arranged. In some embodiments, first sensors 21 may be connected in series or in parallel. Moreover, second sensors 23 may be connected in series or in parallel.

Figure 3B:
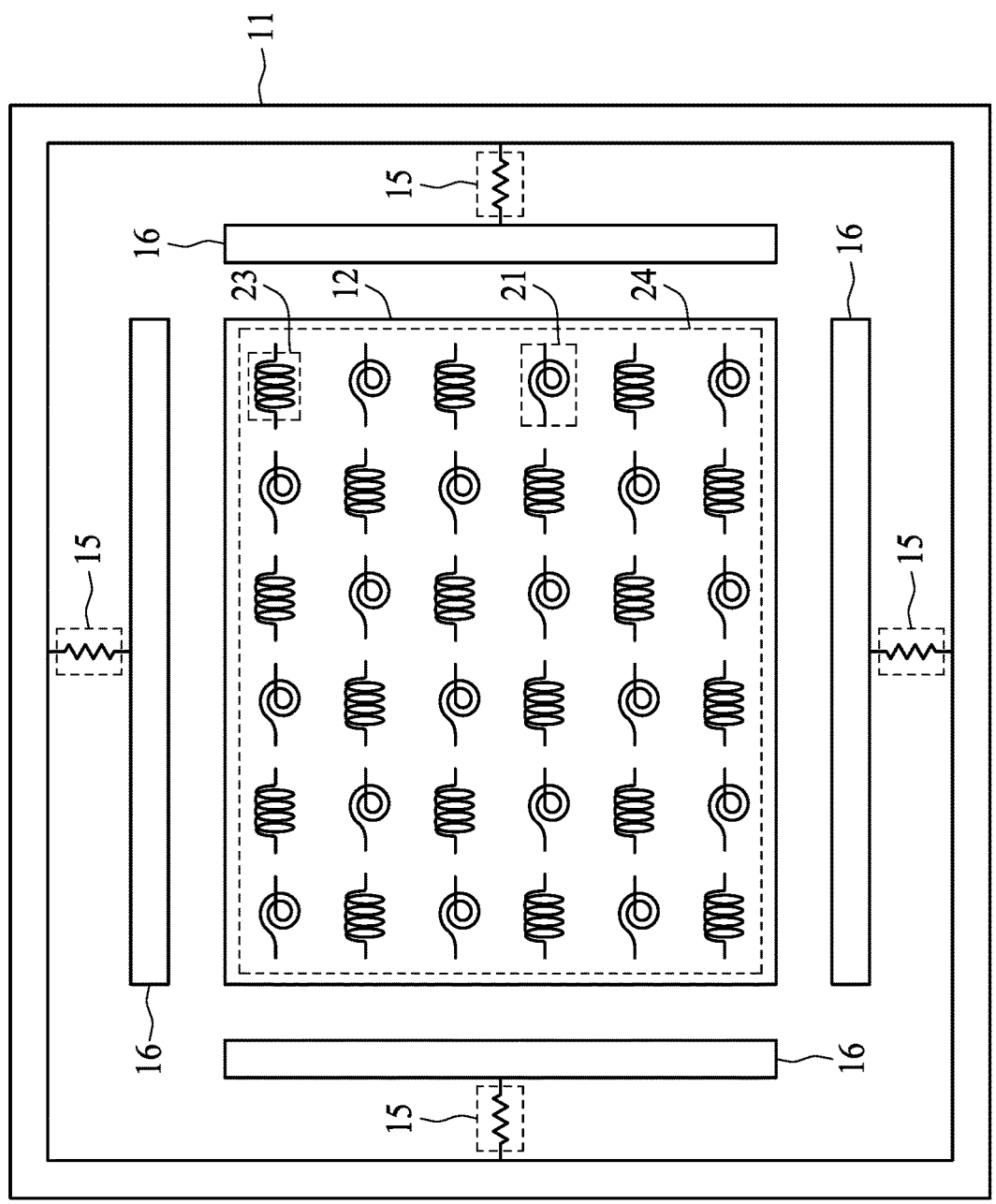
FIG. 3B is a schematic top view of the energy harvesting device illustrated in FIG. 3A in accordance with some embodiments.

FIG. 3B is a schematic top view of energy harvesting device 30 illustrated in FIG. 3A in accordance with some embodiments. Referring to FIG. 3B, semiconductor device 12 includes a sensor array 24 of first sensors 21 and second sensors 23. First sensors 21 and second sensors 23 are alternately arranged at the X-Y plane.

Figure 4:
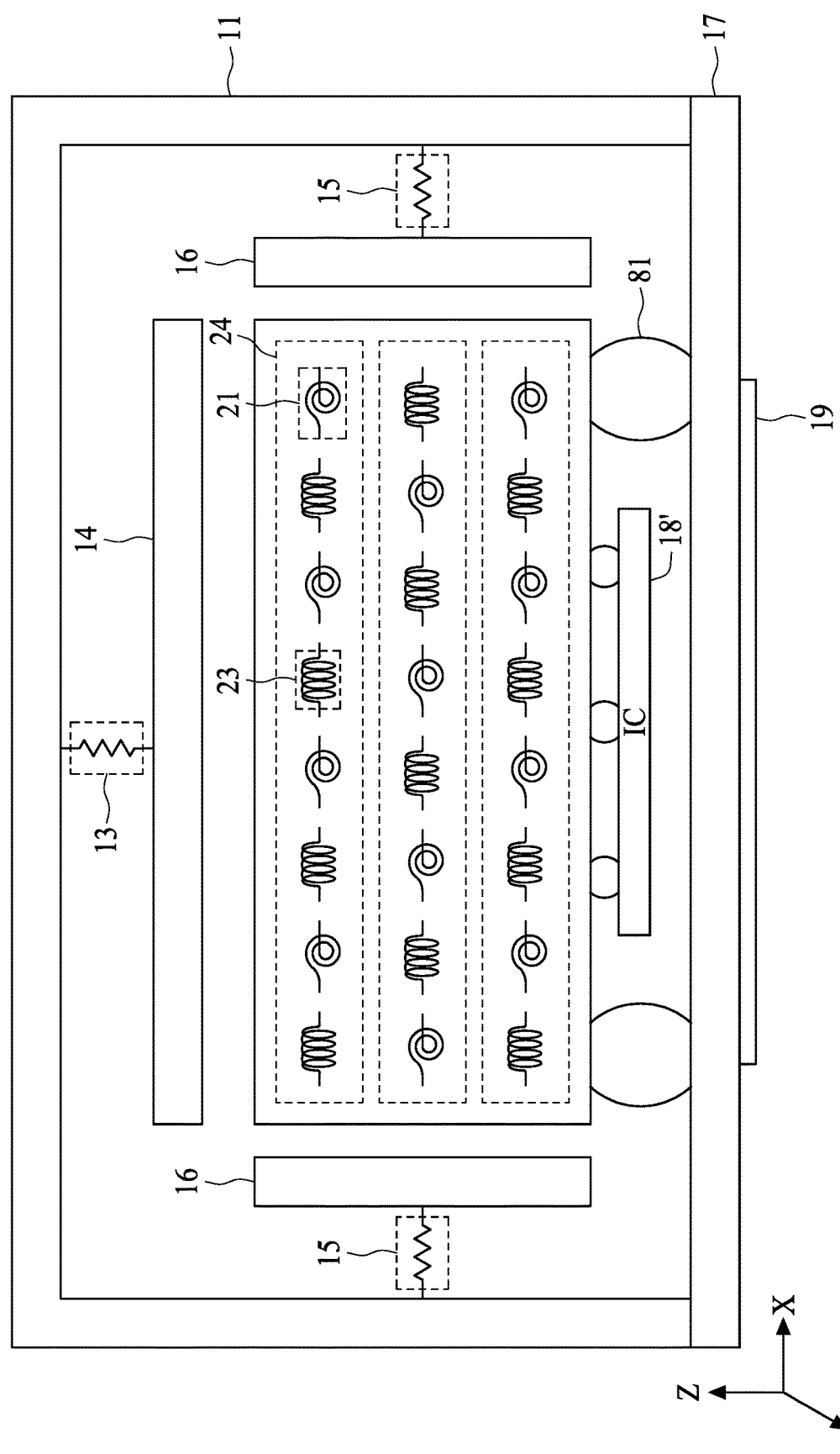
FIG. 4 is a schematic cross-sectional view of an energy harvesting device in accordance with some embodiments.

FIG. 4 is a schematic cross-sectional view of an energy harvesting device 40 in accordance with sonic embodiments. Referring to FIG. 4, semiconductor device 12 includes a stack of sensor arrays 24. The stack extending along the third direction. Each of sensor arrays 24 includes first sensors 21 and second sensors 23. In some embodiments, first sensors 21 and second sensors 23 in one of sensor arrays 24 are alternately arranged. In other embodiments, one of sensor arrays 24 includes an array of first sensors 21 and another one of sensor arrays 24 includes an array of second sensors 23.

According to some embodiments, an energy harvesting device comprises a semiconductor device disposed in a housing, and a first magnet core. The semiconductor device includes planar inductors. The first magnet core, having a first surface over the planar inductors, is configured to move with respect to the semiconductor device in a first direction that reduces a first vertical distance between the plane and the first surface.

In some embodiments, the energy harvesting device further includes a first elastic component coupled between an inner wall of the housing and a second surface of the first magnet core opposite to the first surface. Moreover, the first elastic component includes one of a spring rod and an elastic cantilever.

In some embodiments, the semiconductor device further comprises vertical inductors. The vertical inductors are arranged at least along a line in a second direction along the plane. The energy harvesting device further comprises a second magnet core. The second magnet core has a second surface beside the vertical inductors and configured to move with respect to the semiconductor device in a third direction that reduces a second vertical distance between the line and the second surface. In addition, the vertical inductors surround the planar inductors. Alternatively, the vertical inductors are alternately arranged with the planar inductors.

In some embodiments, the semiconductor device includes an integrated circuit (IC) configured to manage collected energy.

In other embodiments, the energy harvesting device further includes an IC external to the semiconductor device, wherein the IC is configured to manage collected energy.

According to some embodiments, an energy harvesting device comprises a semiconductor device disposed in a housing, a first magnet core and a second magnet core. The semiconductor device includes planar inductors and vertical inductors which are alternately arranged with the planar inductors in an array. The first magnet core is disposed over the array. The second magnet core is disposed beside the array.

In some embodiments, the semiconductor device includes another array stacked over the array.

According to some embodiments, an energy harvesting device comprises a semiconductor device disposed in a housing, a first magnet core and a second magnet core. The semiconductor device includes planar inductors arranged in a first array, and vertical inductors arranged in a plurality of second arrays surrounding the first array. The first magnet core is disposed over the first array. The second magnet core is disposed beside one of the plurality of second arrays and the first array.

A number of embodiments of the disclosure have been described. It will nevertheless be understood that various modifications may be made without departing from the spirit and scope of the disclosure. Embodiments of the disclosure are applicable in various design choices.

What is claimed is:

1. An energy harvesting device, comprising;
a semiconductor device, disposed in a housing, comprising:
planar inductors, arranged at a plane; and
a first magnet core, having a first surface over the planar inductors, configured to move with respect to the semiconductor device in a first direction that reduces a first vertical distance between the plane and the first surface.

2. The energy harvesting device of claim 1, further comprising a first elastic component coupled between an inner wall of the housing and a second surface of the first magnet core opposite to the first surface.

3. The energy harvesting device of claim 2, wherein the first elastic component includes one of a spring rod and an elastic cantilever.

4. The energy harvesting device of claim 1, wherein
the semiconductor device further comprises:
vertical inductors arranged at least along a line in a second direction along the plane; and
the energy harvesting device further comprises:
a second magnet core having a second surface beside the vertical inductors and configured to move with respect to the semiconductor device in a third direction that reduces a second vertical distance between the line and the second surface.

5. The energy harvesting device of claim 4, wherein the vertical inductors surround the planar inductors.

6. The energy harvesting device of claim 4, wherein the vertical inductors are alternately arranged with the planar inductors.

7. The energy harvesting device of claim 1, wherein the semiconductor device includes an integrated circuit (IC) configured to manage collected energy.

8. The energy harvesting device of claim 1, further comprising an IC external to the semiconductor device, wherein the IC is configured to manage collected energy.

9. An energy harvesting device, comprising:
a semiconductor device, disposed in a housing, comprising:
planar inductors; and
vertical inductors, alternately arranged with the planar inductors in an array;
a first magnet core, disposed over the array; and
a second magnet core, disposed beside the array.

10. The energy harvesting device of claim 9, further comprising a first elastic component coupled between an inner wall of the housing and the first magnet core.

11. The energy harvesting device of claim 10, wherein the first elastic component includes one of a spring rod and an elastic cantilever.

12. The energy harvesting device of claim 9, further comprising a second elastic component coupled between an inner wall of the housing and the second magnet core.

13. The energy harvesting device of claim 12, wherein the second elastic component includes one of a spring rod and an elastic cantilever.

14. The energy harvesting device of claim 9, wherein the semiconductor device includes an integrated circuit (IC) configured to manage collected energy.

15. The energy harvesting device of claim 9, further comprising an IC external to the semiconductor device, wherein the IC is configured to manage collected energy.

16. The energy harvesting device of claim 9, wherein the semiconductor device includes another array stacked over the array.

17. An energy harvesting device, comprising:
a semiconductor device, disposed in a housing, comprising:
planar inductors, arranged in a first array; and
vertical inductors, arranged in a plurality of second arrays surrounding the first array;
a first magnet core, disposed over the first array ; and
a second magnet core, disposed beside one of the plurality of second arrays and the first array.

18. The energy harvesting device of claim 17, wherein the semiconductor device further includes an IC, configured to manage collected energy.

19. The energy harvesting device of claim 17, further comprising an IC external to the semiconductor device, wherein the IC is configured to manage collected energy.

20. The energy harvesting device of claim 17, further comprising a battery for storing collected energy.

* * * * *